United States Patent
Willham et al.

(10) Patent No.: US 7,037,576 B2
(45) Date of Patent: May 2, 2006

(54) POLYESTER OR COPOLYESTER/POLYOLEFIN LAMINATE STRUCTURES AND METHODS OF MAKING THE SAME

(75) Inventors: John Edward Christopher Willham, Johnson City, TN (US); Thomas Joseph Pecorini, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/356,011

(22) Filed: Jan. 31, 2003

(65) Prior Publication Data
US 2004/0209097 A1 Oct. 21, 2004

Related U.S. Application Data

(60) Provisional application No. 60/354,469, filed on Feb. 6, 2002.

(51) Int. Cl.
- B32B 27/08 (2006.01)
- B32B 27/30 (2006.01)
- B32B 27/32 (2006.01)
- B32B 27/36 (2006.01)
- B32B 31/14 (2006.01)

(52) U.S. Cl. ............... 428/214; 428/212; 428/213; 428/480; 428/483; 428/515; 428/516; 428/520; 428/522; 428/523; 442/286; 442/287; 442/290; 156/297; 156/299; 156/306.6; 156/327; 156/332

(58) Field of Classification Search .............. None
See application file for complete search history.

(56) References Cited

U.S. PATENT DOCUMENTS

| | | | |
|---|---|---|---|
| 3,668,058 A * | 6/1972 | Pappadakis | 428/215 |
| 4,387,126 A * | 6/1983 | Rebholz | 428/34.3 |
| 4,592,947 A | 6/1986 | Hunter et al. | |
| 4,623,592 A | 11/1986 | Daude et al. | |
| 4,663,417 A | 5/1987 | Hunter et al. | |
| 4,666,758 A | 5/1987 | Hunter et al. | |
| 4,705,707 A * | 11/1987 | Winter | 428/34.3 |
| 4,801,491 A * | 1/1989 | Tanaka et al. | 428/212 |
| 4,939,009 A * | 7/1990 | Beavers et al. | 428/35.2 |
| 5,624,524 A * | 4/1997 | Gordon | 156/311 |
| 5,643,666 A | 7/1997 | Eckart et al. | |
| 5,804,675 A * | 9/1998 | Latiolais et al. | 526/65 |
| 5,847,322 A * | 12/1998 | Sakai et al. | 174/110 R |
| 5,894,048 A | 4/1999 | Eckart et al. | |
| 5,948,544 A * | 9/1999 | Kim et al. | 428/480 |
| 5,958,539 A | 9/1999 | Eckart et al. | |
| 5,998,028 A | 12/1999 | Eckart et al. | |
| 6,025,069 A | 2/2000 | Eckart et al. | |
| 6,180,749 B1 * | 1/2001 | Kim et al. | 528/272 |
| 6,221,191 B1 * | 4/2001 | Davis et al. | 156/150 |
| 6,280,845 B1 * | 8/2001 | Kollaja et al. | 428/411.1 |
| 6,607,834 B1 * | 8/2003 | Davis et al. | 428/457 |
| 2001/0049025 A1 * | 12/2001 | Kollaja et al. | 428/521 |
| 2002/0009605 A1 * | 1/2002 | Davis et al. | 428/461 |

FOREIGN PATENT DOCUMENTS

EP 0301764 A2 2/1989
JP 08-001879 A * 1/1996

* cited by examiner

Primary Examiner—Vivian Chen
(74) Attorney, Agent, or Firm—B. J. Boshears; Bernard J. Graves, Jr.

(57) ABSTRACT

The invention relates to polyester/polyolefin laminate materials having improved properties. The invention also relates to copolyester/polyolefin laminate materials having improved properties. The laminates herein exhibit improved results in flammability studies. The invention further relates to methods of making laminate structures.

16 Claims, 1 Drawing Sheet

POLYESTER OR COPOLYESTER/POLYOLEFIN LAMINATE STRUCTURES AND METHODS OF MAKING THE SAME

CROSS REFERENCE TO RELATED APPLICATIONS

This application claims priority to U.S. Provisional Application No. 60/354,469, filed Feb. 6, 2002, the disclosure of which is herein incorporated in its entirety by this reference.

FIELD OF THE INVENTION

The invention relates to polyester/polyolefin laminate materials having improved properties. The invention also relates to copolyester/polyolefin laminate materials having improved properties. The invention further relates to methods of making laminate structures.

BACKGROUND OF THE INVENTION

It is common for the properties of a single material to be insufficient to meet the performance requirements of a desired application. To obtain the desired performance, different materials may be brought together to form a laminate structure. Examples of such laminates include combination of a flexible material with a less flexible (e.g., structural) material or combination of a decorative material with a functional material. However, in many cases, the materials to be combined are not sufficiently compatible to provide the necessary adhesion to obtain a durable or high performance laminate structure.

In order to improve the adhesion of two disparate layers, a "tie layer" may be inserted between the layers of the laminate structure. The material used in the tie layer normally exhibits compatibility with the different layers but the material may not itself provide properties to the laminate other than adhesion. In short, the tie layer is the "glue" that binds the disparate layers of the laminate material together.

One laminate structure that has found use is one obtained by combining polyester or copolyester materials with papers, films, textiles or fabrics, where the materials combined with the polyester or copolyester materials may be either naturally or synthetically derived. Such laminates are used in varied applications because they are known to provide enhanced structural performance (e.g., impact protection, moisture barriers, sound barriers and sight barriers) and improved aesthetics. Examples of common uses for such laminates are locations where somewhat lightweight structural structures are needed, such as cruise ship and aircraft interiors, building interiors and office furnishings, such as partitions and other space dividers where a good appearance is desired along with structural support.

It is known that polyesters and copolyesters do not adhere well to polyolefin materials. As such, tie layers may be used to improve the adhesion of these materials. Commonly used tie layer materials are based on ethylene/vinyl acetate copolymers (EVA copolymers) or EVA copolymers containing copolymerized or grafted glycidyl methacrylate or maleic anhydride.

However, polyester or copolyester/polyolefin laminate structures having tie layers made from EVA-containing materials exhibit poor flammability properties because EVA is a highly flammable material. This property limits the use of EVA as a tie layer for structures where low flammability is required, such as in cruise ship and aircraft interiors and in office and building interiors. Materials for use in these locations require that building materials pass one or more flame tests such as ASTM D 635 (Burning Rate of Self-Supporting Plastics in a Horizontal Position), UL 94 (Flammability of Plastic Materials for Parts in Devices and Appliances) and ASTM E 84 (Surface Burning Characteristics of Building Materials).

In light of the above, there exists a need to obtain laminate structures made from polyester or copolyester materials having one or more polyolefin layers where such structures will exhibit improved performance in industry-standard flammability tests such as those discussed above. In accordance with this objective, the present invention provides improved polyester or copolyester/polyolefin structures using a material for the tie layer that results in improved performance in flammability tests.

SUMMARY OF THE INVENTION

The invention relates generally to polyester/polyolefin laminate materials having improved properties. The invention also relates generally to copolyester/polyolefin laminate materials having improved properties. The tie layer for the laminates of the present invention comprises alkyl acrylate copolymer. The laminates according to the invention herein exhibit improved performance in flammability tests. The invention further relates to methods of making laminate structures. The laminates of the present invention exhibit comparable or superior aesthetics, structural strength and integrity, tensile strength and impact strength when compared to laminates using other adhesive materials in the tie layer.

Additional advantages of the invention will be set forth in part in the description that follows, and in part will be apparent from the description, or can be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
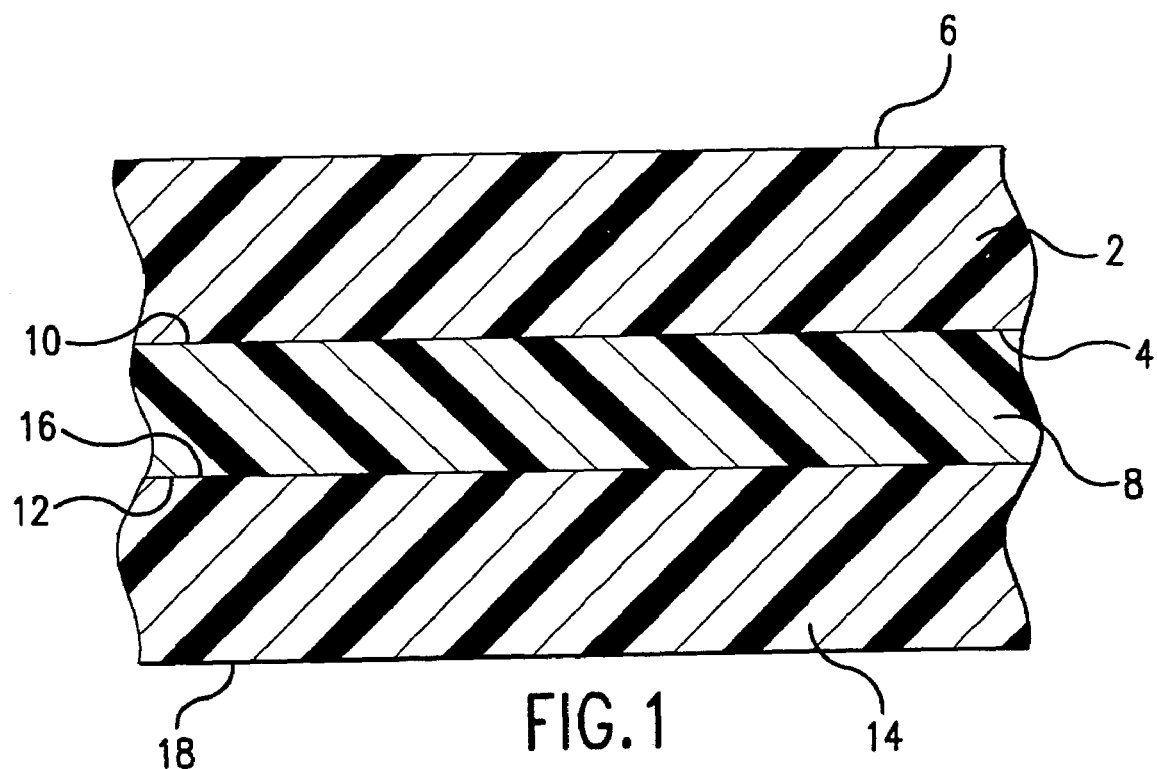
FIG. 1 is a schematic of one example of a laminate structure of the present invention.

The present invention can be understood more readily by reference to the following detailed description of the invention and the Examples included herein and to the FIGURE and its previous and following description. It is also to be understood that the terminology used herein is for the purpose of describing particular aspects only and is not intended to be limiting.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

Often ranges are expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

In the specification and in the claims that follow, reference will be made to a number of terms that shall be defined to have the following meanings:

The term "copolymer" as used herein refers to polymers comprising two or more monomeric units in the same molecule. The term is intended to include materials commonly referred to as copolymers, terpolymers, block copolymers, random copolymers, alternating copolymers, graft copolymers and other similar terms.

The term "acrylate" as used herein refers to an ester of acrylic acid or an ester of a derivative of acrylic acid such as methacrylic acid.

The term "methacrylate" as used herein refers to an ester of methacrylic acid or an ester of a derivative of methacrylic acid.

The term "structural" as used herein means "self supporting" as in being capable of being used in applications where it is desirable that the laminates need little or no supporting means to allow the laminates to maintain the desired shape and position while in use. An example of a structural application is an office partition or an aircraft or cruise ship interior.

The invention relates generally to laminate structures having at least one polyolefin layer, an ethylene/alkyl acrylate ("EAA") copolymer tie layer and at least one polyester or copolyester layer. The invention also relates to methods of making such laminates. In particular, EAA copolymers have been found by the inventors herein to exhibit improved performance when used as tie layers for such laminates. Moreover, it has been surprisingly found that the laminate structures of the present invention exhibit improved flame resistance over laminate structures having tie layers comprising EVA copolymers.

The structures of the present invention also exhibit comparable or superior aesthetics, structural strength and integrity, tensile strength and impact strength when compared to laminates using EVA as the tie layer. As such, the laminates of the present invention are acceptable for use in cruise ship and aircraft interiors, office panels and interior furnishings where a combination of excellent flame resistance with structural and decorative properties are required. Also, the laminates of the present invention are to be distinguished from laminates prepared for and used in packaging applications, which are not considered to be part of the invention herein.

Any polyester or copolyester materials known in the art are suitable for use herein, as long as such polyesters and copolyesters are suitable for use in structural applications as defined elsewhere herein.

When polyesters are utilized for one or more layers of the laminates of the present invention, the polyesters can include poly(ethylene terephthlate) ("PET"), poly(1,4 butylene terephthlate ("PBT") and poly(1,4-cyclohexylene dimethylene terephthlate) ("PCT"). The polyesters may comprise at least about 50 mol % of one or more of the following dicarboxylic acids: terephthalic, napthalenedicarboxylic and 1,4-cyclohexane dicarboxylic acid and at least about 50 mol % of one or more of the following glycols: ethylene glycol, diethylene glycol, cyclohexanedimethanol and neopentyl glycol.

When copolyesters are utilized for one or more layers of the laminate of the present invention, one or more PETG copolyesters available from Eastman Chemical Company (Kingsport, Tenn.) may be utilized. Such copolyesters generally are amorphous and exhibit a low level of crystallinity and comprise repeating units of diacid residues and diol residues. At least about 80 mole % of the diacid residues can be terephthalic acid residues. The diacid component of the copolyesters optionally may comprise up to 20 mole % of one or more other dicarboxylic acid such that the sum of the dicarboxylic acid units is equal to about 100 mol %. Examples of such other dicarboxylic acids that may be included in the copolyesters include phthalic acid, isophthalic acid, 1,4-, 1,5-, 2,6- or 2,7-naphthalenedicarboxylic acid, 1,3- or 1,4-cyclohexanedicarboxylic acid (which may be cis, trans or a mixture thereof), cyclohexanediacetic acid, trans-4,4'-stilbenedicarboxylic acid, 4,4'-oxydibenzoic acid, 3,3'- and 4,4'-biphenyldicarboxylic acids and aliphatic dicarboxylic acids such as malonic, succinic, glutaric, adipic, pimelic, suberic, azelaic, sebacic, nonane, decane, and dodecanedicarboxylic acids. The "residue" of the dicarboxylic acids described herein is that portion of the diacid which constitutes a portion of a diester of the diacid. The diacid residues can be derived from the dicarboxylic acid, dialkyl esters thereof, e.g., dimethyl terephthlate and bis (2-hydroxyethyl) terephthlate, acid chlorides thereof and, in some cases, anhydrides thereof.

The diol component of the copolyesters may comprise from about 98 to about 1-mole % ethylene glycol residues and about 2 to about 99 mole % 1,3-cyclohexanedimethanol and/or 1,4-cyclohexanedimethanol. Up to about 20 mole % of the diol component can be made up of the residues of one or more diols other than ethylene glycol and cyclohexanedimethanol such that the sum of all diol residues is about 100 mole %. Examples of such additional diols include cycloaliphatic diols having from about 3 to about 16 carbon atoms and aliphatic diols having from about 3 to about 12 carbon atoms. Non-limiting examples of such other diols that can be used in the copolyesters of the present invention may include 1,2-propanediol, 1,3-propanediol, neopentyl glycol, 1,4-butanediol, 1,5-pentanediol, 1,6-hexanediol, 2,2,4,4-tetramethyl-1,3-cyclobutanediol (trans-, cis- or mixtures thereof), 2,2,4-trimethyl-1,3-pentanediol and p-xylylene glycol. The copolyesters also can be modified with minor amounts of polyethylene glycols or polytetramethylene glycols to enhance elastomeric behavior, e.g., polyethylene glycols and polytetramethylene glycols having weight average molecular weights in the range of from about 500 to about 2000. The diol component of the copolyesters can consist essentially of residues of ethylene glycol and 1,4-cyclohexanedimethanol wherein the mole ratio of ethylene glycol residues: 1,4-cyclohexanedimethanol residues is about 10:90 to about 90:10, or from about 60:40 to about 80:20.

The copolyesters utilized in the present invention can have an inherent viscosity in the range of from about 0.5 to about 1.5 dL/g., or from about 0.6 to about 1.2 dL/g., or from about 0.6 to 0.9 when measured at 25° C. using 0.50 grams of polymer per 100 ml of a solvent, which consists of 60% by weight phenol and 40% by weight tetrachloroethane. Still further, copolyesters suitable for use herein can have inherent viscosities of from about 0.7 to about 1.1 dl/g when measured as defined previously. Still further, the inherent viscosity of the copolyesters of the present invention may be from about 0.5, 0.6, 0.7, 0.8, 0.9, 1.0, 1.1, 1.2, 1.3, 1.4 or 1.5 dL/g, when measured as described previously and wherein any lower and upper value may be used as the endpoint, as appropriate.

Although not required, very small amounts (up to about 2 mol %) of branching agents such as trimellitic acid, trimellitic anhydride, pyromellitic dianhydride, glycerol, trimethylolpropane, and pentaerythritol can be utilized in the polyesters or copolyesters of the present invention.

The polyesters and copolyesters used in the present invention can have Tg's of from about 50° C. to about 110° C., or from about 60° C. to about 90° C., or from about 70° C. to about 85° C. Still further, the polyesters and copolyesters of the present invention can have Tg's of from about 50, 55, 60, 65, 70, 75, 80, 85, 90, 95, 100, 105, 110, 115, 120° C., where any value can form an upper or a lower endpoint, as appropriate.

The polyesters and copolyesters useful in the present invention can be prepared by conventional polycondensation procedures well known in the art. Such processes include direct condensation of the dicarboxylic acid(s) with the diols or by ester interchange using a dialkyl or diaryl dicarboxylate. For example, a dialkyl terephthlate, e.g., dimethyl terephthlate or bis (2-hydroxyethyl) terephthlate, or a diaryl ester such as diphenyl terephthlate is ester interchanged with the diols at elevated temperatures in the presence of a polycondensation catalyst.

The polyolefin materials that form one or more layers of the laminates of the present invention can comprise polyethylene, polypropylene, poly-1-butene, and ethylene copolymers containing alpha olefins having from about 3 to about 10 carbon atoms or other similar materials. The polyethylene materials can comprise one or more of: low density, linear low density, medium density and high-density materials. Yet further, the polyolefin materials may comprise substantially linear ethylene polymer materials. The polyethylene materials used herein can have melt indices of from about 0.1 to about 50, or from about 1 to about 30. Still further, the melt indices of the polyethylene materials may be from about 0.1, 0.5, 1.0, 5.0, 10.0, 20.0, 30.0, 40.0 or 50.0, where any value may be used as an upper or lower endpoint, as appropriate.

In separate aspects, the polyethylene material can be in the form of woven or non-woven fabric, film (e.g. having a thickness of from about 1.0 to about 20 mils) or sheeting (e.g., having a thickness of from about 20 mils to about 100 mils). A particularly useful polyethylene material has been found to be Xorel® polyethylene fabric (Carnegie Fabrics, NY, N.Y.).

As mentioned, the tie layer that serves to adhere the polyester or copolyester layer(s) to the polyolefin layer(s) so as to provide the laminate of the present invention comprises an alkyl acrylate copolymer. Still further, the tie layer consists essentially of an alkyl acrylate copolymer or an ethylene alkyl acrylate copolymer. Yet further, the tie layer material does not comprise a vinyl material.

Copolymers suitable for use as the tie layer of the invention include copolymers of olefins, acrylates and methacrylates. Particularly useful copolymers can include olefin/acrylate copolymers, olefin/methacrylate copolymers, other comparable copolymers and mixtures thereof. The copolymers suitable for use herein typically have melt indices from about 0.2 to about 50 gms/10 min, as measured according to the procedures specified in ASTM D-1238, the disclosure of which is incorporated herein in its entirety by the reference. The copolymers can be prepared by procedures well known to one of ordinary skill in the polymer art.

The olefin component of the copolymer can contain from about 2 to about 18 carbon atoms. In further aspects, the copolymer can contain from about 3, 4, 6, 8, 10, 12, 14, 16 and 18 carbon atoms where any of these values can be used as the upper and lower endpoint, as appropriate. In further aspects, the olefin component can comprise one or more of: ethylene, propylene or butylene. Still further, the olefin component of the copolymer can comprise ethylene. In further aspects, the olefin component of the copolymer can comprise from about 40 to about 99 wt. %, or from about 70 to about 97 wt. %, or from about 75 to about 95 wt. % of the copolymer. Still further, the olefin component can comprise from about 40, 45, 50, 55, 60, 65, 70, 75, 80, 85, 95 or 99 wt. % of the copolymer, where any of the values can be used as an upper end or lower endpoint, as appropriate.

The acrylate or methacrylate component of the copolymer can comprise alkyl acrylates, alkyl methacrylates, or combinations thereof, with a composition of:

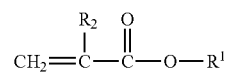

wherein $R^1$ is alkyl group of up to about 8 carbon atoms, in particular, an alkyl group of 1 to 4 carbon atoms, and $R^2$ is hydrogen, methyl or ethyl. The amount of acrylate or methacrylate component in the copolymer can comprise from about 1 to about 60 wt. %, or from about 3 to about 30 wt. %, or from about 5 to about 25 wt. % of the copolymer. Still further, the amount of acrylate or methacrylate component in the copolymer component can comprise from about 1, 3, 5, 7, 10, 15, 20, 25, 30, 35, 40, 45, 50, 55 or 60 wt. %, where any value can be used as the lower or upper endpoint, as appropriate. Particular alkyl acrylates that can be utilized can comprise methyl, ethyl, propyl, and butyl esters of acrylic or methacrylic acid. As used herein, the amount of acrylate or methacrylate component in the copolymer is determined by a total wt. % of the acrylate, including the alkyl group.

Still further, the alkyl acrylate copolymers suitable for use herein contain typically contain from about 5 to about 50 wt % alkyl acrylate and from about 95 to about 50 wt % ethylene. Yet still further, the ethylene-acrylate copolymers can contain from about 10 to about 40 wt % alkyl acrylate and from about 90 to about 60 wt % ethylene. In a further aspect, the ethylene-acrylate copolymers can contain from about 15 to about 40 wt % alkyl acrylate and from about 85 to about 60 wt % ethylene.

Particular examples of alkyl acrylate comonomers that may be used in accordance with the invention herein include one of more of: methyl acrylate, ethyl acrylate, butyl acrylate and methyl methacrylate. The ethylene-alkyl acrylate copolymers are exemplified by ethylene-methyl acrylate copolymer ("EMA"), ethylene-ethyl acrylate copolymer ("EEA"), ethylene-butyl acrylate copolymer ("EBA") and ethylene-methyl methacrylate copolymer.

The laminates of the present invention can typically comprise one or more layers of polyester or copolyester, wherein the polyester or copolyester has a thickness of from about 0.040 to about 0.50 inches. Still further, the thickness of the polyester or copolyester layer can be from about 0.080 inches to about 0.250 inches. Yet still further, the thickness of the polyester or copolyester layer can be from about 0.040, 0.080, 0.100, 0.100, 0.150, 0.200, 0.250, 0.350, 0.400, 0.450, 0.500, 0.550, 0.600, 0.650, 0.700, 0.750, 0.800, 0.850, 0.900, 0.950 and 1.0 inches, where any value can comprise an upper or lower endpoint, as appropriate.

The tie layer can have a total thickness of from about 0.0005 to about 0.020 inches. The tie layer can also have a total thickness of from about 0.005 to about 0.015 inches. Still further, the tie layer can have a thickness of from about 0.010, 0.020, 0.030, 0.040, 0.050, 0.060, 0.070, 0.080, 0.090, 0.100, 0.110, 0.120, 0.125, 0.130, 0.140, 0.0150, 0.160, 0.170, 0.180, 0.190 and 0.200 inches, where any value can be used as an upper or lower endpoint, as appropriate.

The polyolefin layer of the laminates of the present invention can have a total thickness of from about 0.001 to about 0.020 inches. Still further, the polyolefin layer can have a thickness of from about 0.002, 0.003, 0.004, 0.005, 0.006, 0.007, 0.008, 0.009, 0.010, 0.015, 0.020, 0.025, 0.030, 0.035, 0.040, 0.045 and 0.050 inches, where any value may be used as an upper or lower endpoint, as appropriate.

In a significant aspect of the present invention, the laminates of the present invention will have a minimum flame rating of HB as tested by UL 94 Standard for Safety for Flammability of Plastic Materials for Parts in Devices and Appliances. In yet a further significant aspect of the present invention, the laminates of the present invention will have a burning extent of one inch or less for laminate panels as tested by ASTM D 635. Still further, the laminates of the present invention meet the minimum requirements for passing one or more of the following flammability tests: ASTM D 635 (Burning Rate of Self-Supporting Plastics in a Horizontal Position), UL 94 (Flammability of Plastic Materials for Parts in Devices and Appliances) and ASTM E 84 (Surface Burning Characteristics of Building Materials). The disclosures of each of these tests are each herein incorporated in their entireties by this reference.

A method for preparing the synthetic laminate structure of the present invention can involve at least two or more steps.

A first step involves combining the various layers of materials into a "pre-laminate" structure.

In one aspect of making the pre-laminate material, the various layers may be co-extruded in accordance with methods known to one of ordinary skill in the art. In the co-extrusion to make a 3 layer laminate structure ("ABC"), the layers are laid out in a "sandwich" form, wherein the B layer is the alkyl acrylate material and either of the A or C layers can be either the polyester or copolyester layers or the polyethylene layer. When the coextrusion is in a 5 layer laminate structure, there can be any suitable mix of layers, provided there is an alkyl acrylate tie layer present at any location where a polyester or copolyester layer is proximal to a polyolefin layer.

Referring now to FIG. 1, a polyester layer 2 has an inner surface 4 and an outer surface 6. The tie layer 8 has first surface 10 and a second surface 12. The first surface 10 is adjacent to the inner surface 4. The polyethylene layer 14 has an inner surface 16 and an outer surface 18. The inner surface 16 is adjacent to the second surface 12. The laminate structure of FIG. 1 illustrates one example of an ABC laminate as discussed herein.

By "proximal," it is meant that one layer would be adjacent (i.e., next to) another layer but for the presence of a tie layer. Put another way, in an ABC laminate structure, the A and C layers are proximal to each other and the B layer is adjacent to both the A and C layers.

In a further aspect of making the pre-laminate material, the tie layer material can be applied to a surface of the polyester or copolyester layer. For example, in an ABC laminate structure, A may be the copolyester component. The B layer is the tie layer. In this aspect, the tie layer material can be applied to a surface of the polyester or copolyester material, such as by extrusion or by application of a sheet material. A polyethylene material may then be applied to the outer surface of the tie layer (that is, the surface opposite the copolyester material) to form a structure suitable for lamination. In this method to make the pre-laminate material, the tie layer material can be continuous or substantially continuous along the surface of the polyester or copolyester material. If not continuous, as would be understood by one of ordinary skill in the art, the application of heat and/or pressure to the pre-laminate material as discussed below will result in the tie layer material flowing and/or spreading to provide a uniform or substantially uniform layer in the finished laminate material.

A second step in preparing the laminate structure involves applying heat and/or pressure to the pre-laminate to flow and spread the tie layer into a substantially continuous layer providing an effective bond between the polyester/copolyester and polyolefin layers, wherein the finished laminate material is characterized by a substantial absence of visible air pockets or adhesion discontinuities.

Lamination is conducted at a temperature and pressure sufficient to cause the tie layer bond to each of the adjacent layers without causing decomposition, distortion or other undesirable effects.

Assembly of the laminated structure can be performed in two steps: lay-up and lamination. The lay-up, which may be performed by hand, involves assembling the materials in order in an assembly area prior to lamination of the layers into a single fixed panel. Typical panel sizes range from about 1 square foot to about 100 square feet in area. The assembly area will generally be a controlled environment, commonly a clean room that reduces the likelihood of imperfections with air filters, static dissipating flooring, etc. A sheet of or copolyester can be the first layer in the laminate structure (removal of protective masking and wipe down may be required) followed a layer of the desired adhesive medium, such as an EMA film supplied by BJK Industries (Louisville, Ky.) or Adhesive Films Inc. (Pine Brook, N.J.). Following lay-up of the adhesive film upon the polyester sheet, the polyolefin film or fabric is positioned upon the adhesive layer. Upon the polyolefin layer, lamination enhancement media, such as metal plates for heat conduction, texturing fabrics, dividing papers may be used. It is common in practice to have multiple laminates in a single press. In such case, additional laminate surfaces are produced, except in reverse order: polyolefin fabric, adhesion media and polyester sheeting. Such positioning is done so the polyester sheeting layer is the layer closest to the lamination platens in the laminating press (top and bottom).

A portion of the lamination lay-up process may be eliminated if the tie layer adhesive, such as EMA, is pre-laminated or coextruded on the polyester sheet. A coextruded tie layer can offer additional benefits of quicker lay-up (as one less layer is required for each panel) and can lessen the likelihood of delamination between the adhesive an polyester surfaces after lamination.

Following lay-up, materials can be laminated in a laminating press or in an autoclave. Typical lamination involves two stages: heating and cooling. During the heating phase, the surface interface of the adhesive and polyester are heated of from about 180 to about 230° F. or of from about 195 to about 215° F. under a constant pressure between about 10 and about 100 psi of from about 40 to about 70 psi. Press temperatures may vary depending on heating media used (electric coils, steam, hot oil) but are typically in the range of from about 300 to about 400° F. Following a heating cycle of from about 10 to about 30 minutes new laminate can be moved to a cooling press. The cooling press may be operated with chilled water or cooled platens operate at pressures of 10 to about 100 psi or from about 50 to about 90 psi.

As mentioned, EMA co-extrusions with polyester (such as Spectar® 14471 copolyester manufactured by Eastman Chemical Company) offer additional benefits during lay-up (less layers to lay by hand and reduces chances for debris) and use (reduces likelihood for delamination at the adhesive/polyester interface). Such co-extrusions are produced by first drying the polyester material in a desiccated air dryer. Then the dried polyester resin is fed to a sheet or film extrusion line. A satellite extrusion line can be used to introduce the coextruded tie layer (such as EMAC, Eastman Chemical Company's EMA resin).

Once the synthetic laminate structure is cooled it may be shaped and formed into a variety of useful articles by thermoforming.

Non-limiting examples of articles that may be prepared from the laminates of the present invention include: light diffusers, lighting fixtures, office furnishings, decorative flooring and bathroom panels for mass transit vehicles.

The materials constituting the outermost layers of the laminate structures herein may not be as hard or scratch resistant as may be necessary or desired for certain end uses. For example, an end use in which the exterior surface of the thermoplastic article may be subjected to scratching or abrasion, i.e., in a privacy partition, may require the application of an abrasion-resistant, transparent coating (hardcoat) to one or both of the exterior surfaces of the article. For example, films consisting of fluorinated hydrocarbon, poly (perfluoroethylene) such as TEDLAR from DuPont Chemical Company (Wilmington, Del.) or oriented poly(ethylene terephthlate) such as MYLAR from DuPont Chemical Company) may be used to improve both chemical and abrasion resistance. The abrasion resistant film typically has a thickness in the range of from about 0.025 to about 0.254 mm (0.001–0.01 inch), or from about 0.051 to about 0.178 mm (0.002–0.007 inch) or about 0.076 mm (0.003 inch). However, abrasion resistant film thinner or thicker than these ranges may be used since the thickness of such film is limited only by the equipment available, cost and functionality considerations. An adhesive optionally may be used between the copolyester and the abrasion resistant film.

Alternatively, an abrasion resistant coating may be applied to a plastic film and then the film bearing the abrasion resistant coating may be laminated to one or both sides of the laminates of the present invention. The film may be selected from a number of thermoplastic materials compatible with the lamination process such as poly(vinyl chloride), PETG copolyester, poly(ethylene terephthlate), poly(methyl methacrylate), polycarbonate and similar materials. The film thickness may range from about 0.0025 to about 0.381 mm (0.001–0.015 inch) or from about 0.0762 to about 0.203 mm (0.003–0.008).

The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is from about 0.0076 to about 0.051 mm.

These coatings may be applied in a manner similar to the application of paints. The coatings exist either as predominantly undiluted material with very little volatile content or as solvent- or water-based materials. In addition to being applied to a film that can be laminated to the structure as part of the process, they may be applied directly to the finished product. Application may be carried out by a variety of techniques such as roll, paint, spray, mist, dip and the like.

In an important aspect, the laminate structures prepared by this invention will have a minimum flame rating of HB as tested by UL 94 Standard for Safety for Test for Flammability of Plastic Materials for Parts in Devices and Appliances and have a burning extent of one inch or less for panels as tested by ASTM D 635, which is required by the 2000 International Building Code (IBC) and/or the 1997 Uniform Building Code (UBC) to obtain a CC1 rating as an approved light-transmitting plastic. The disclosures of each of these building code requirements is incorporated herein in their entireties by this reference.

EXAMPLES

The following examples are put forth so as to provide those of ordinary skill in the art with a complete disclosure and description of how the compounds, compositions, articles, devices, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

Comparative Example 1

A 12"×12" panel of copolyester sheet (Spectar,® Eastman Chemical Co., Kingsport, Tenn.) was laminated with a polyethylene-based fabric (Xorel,® Carnegie Fabrics, New York, N.Y.) with an ethylene vinyl acetate (EVA) tie layer consisting of two 2.5 mil layers of EVA film (Adhesive Films, Inc.). From the copolyester panel, a 1" wide by 6" long strip was cut and was horizontally supported by a metal clamp 1" on its end. The exposed end of the sample was then subjected to a flame (fabric side down) from a Bunsen burner with gas pressure of 3 psi for 20 seconds wherein ignition of the panel commenced. After 20 seconds the Bunsen flame was removed and the following observations noted:

Time (T)=0 seconds: Bunsen flame introduced to sample.

T=9 seconds: Flame propagation on the fabric surface observed. Flame begins to travel along the surface of the sample. No ignition of the copolyester layer is observed.

T=18 seconds: Copolyester layer is ignited. Two-phase burning observed as flame continues to travel along sample surface. Fabric is ignited and dripping.

T=20 seconds: Bunsen flame removed from sample.

T=22 seconds: Ignited copolyester drips and then extinguishes at exposed end. Flame continues to travel along surface.

T=50 seconds: Surface flame reaches clamped end of sample and test is terminated.

Comparative Example 2

A 12"×12" panel of a copolyester sheet (Spectar) was laminated with a polyethylene-based fabric (Xorel) with an ethylene vinyl acetate (EVA) tie layer consisting of a single 2.5-mil layer of EVA film (Adhesive Films, Inc.). From the panel, a 1" wide by 6" long strip was cut and was horizontally supported by a metal clamp 1" on its end. The exposed end of the sample was then subjected to a flame (fabric side down) from a Bunsen burner with gas pressure of 3 psi for 20 seconds wherein ignition of the sample commenced. After 20 seconds the Bunsen flame was removed and the following observations noted:

Time (T)=0 seconds: Bunsen flame introduced to sample.

T=8 seconds: Flame propagation on the fabric surface observed. Flame begins to travel along the surface of the sample. No ignition of the copolyester layer is observed.

T=15 seconds: No ignition of the copolyester layer. Flame continues to travel along fabric surface. Fabric is ignited and dripping.

T=19 seconds. Copolyester layer is ignited. Two-phase burning observed. Flame continues to travel along sample surface with fabric ignited and dripping.

T=20 seconds: Bunsen flame removed from sample. Copolyester drips and extinguishes at exposed end. Flame front continues to progress along surface.

T=38 seconds: Surface flame reaches clamped end of sample and test is terminated.

Comparative Example 3

Laminates of ⅛" total thickness were produced with a base layer of extruded Spectar copolyester, and adhesion layer of EVA film (from Adhesive Films, Inc.) and Xorel fabric (from Carnegie Fabrics) and submitted to SGS U.S. Testing Company (Fairfield, N.J.) for testing according to ASTM D 635-98: Standard Test Method for Rate of Burning and/or Extent and Time of Burning of Self-supporting Plastics in a Horizontal Position. The following results were obtained:

| Specimen | Dimensions (mm) | Burning Time, (Seconds) | Extent of Burning (mm) |
| --- | --- | --- | --- |
| 1 | 125.0 × 15.5 × 3.4 | 442 | 75 |
| 2 | 125.0 × 16.6 × 3.4 | 128 | 33 |
| 3 | 125.0 × 16.0 × 3.4 | 434 | 75 |
| 4 | 125.0 × 16.2 × 3.4 | 83 | 12 |
| 5 | 125.0 × 15.1 × 3.4 | 468 | 75 |

Observations: Charring, melting
NOTE:
No burn rates could be determined.
As per UBC Standard 26-7 the material tested meets a CC2 Classification.

Example 1 of the Invention

A 12"×12" panel of copolyester sheet (Spectar) was laminated with a polyethylene-based fabric (Xorel) with an ethylene methyl acrylate (EMA) EMAC® from Eastman Chemical Co.) tie layer consisting of a single 5-mil layer of EMA film. From the panel, a 1" wide by 6" long strip was cut and was horizontally supported by a metal clamp 1" on its end. The exposed end of the sample was then subjected to a flame (fabric side down) from a Bunsen burner with gas pressure of 3 psi for 20 seconds wherein ignition of the sample commenced. After 20 seconds the Bunsen flame was removed and the following observations noted:

Time (T)=0 seconds: Bunsen flame introduced to sample.

T=19 seconds. Copolyester layer is ignited. Flame remains at exposed end of sample.

T=20 seconds: Bunsen flame removed from sample. Copolyester drips but does not yet extinguish. No flame spread.

T=29 seconds: Sample completely extinguishes. No flame spread beyond exposed edge is observed.

Example 2 of the Invention

Laminates of ⅛" total thickness were produced with a base layer of extruded Spectar copolyester, and adhesion layer of EMA film (produced from EMAC resin from Eastman Chemical Company) and Xorel fabric (from Carnegie Fabrics) and submitted to SGS U.S. Testing Company for testing according to ASTM D 635-98: Standard Test Method for Rate of Burning and/or Extent and Time of Burning of Self-supporting Plastics in a Horizontal Position. The following results were obtained:

| Specimen | Dimensions (mm) | Burning Time, (Seconds) | Extent of Burning (mm) | Burn Rate (mm/min.) |
| --- | --- | --- | --- | --- |
| 1 | 125.0 × 13.0 × 4.0 | 357 | 75 | 12.60 |
| 2 | 125.0 × 13.0 × 4.0 | 305 | 75 | 14.75 |
| 3 | 125.0 × 13.0 × 4.0 | 226 | 75 | 19.91 |
| Average | 125.0 × 13.0 × 4.0 | 300* | 75 | 15.00 |

Observations: Melting, crackling, dripping, flaming
As per UBC Standard 26-7 the material tested meets a CC1 Classification.
*Rounded after averaging to the nearest multiple of 5.

The above tests demonstrate that laminates which have EMA as the tie layer exhibit marked by improved burn characteristics over laminates that use EVA as the tie layer. Additionally, it is noted that these tests correlate with the ASTM and UL flammability tests discussed elsewhere herein and incorporated herewith. As such, these tests demonstrate that laminates of the present invention are better suited for use in applications where low flammability is necessary.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

The invention claimed is:

1. A polyester or copolyester/polyolefin laminate comprising:
   a) a first polymer layer comprising a polyester or a copolyester, wherein the first polymer layer has an inner and an outer surface, and a thickness of from about 0.080 inches to about 0.250 inches;
   b) a tie layer comprising consisting essentially of an alkyl acrylate copolymer having a first surface and a second surface, wherein the first surface is adjacent to the inner surface of the first polymer layer; and c) a second polymer layer comprising a polyolefin, wherein the second polymer layer has an inner and an outer surface, and wherein the second surface of the tie layer is adjacent to the inner surface of the second polymer layer.

2. The laminate of claim 1, wherein the laminate is suitable for applications where a CC1 classification is required as defined by UBC Standard 26-7.

3. The laminate of claim 1, wherein the tie layer comprises one or more of: ethylene-methyl acrylate copolymer, ethylene-ethyl acrylate copolymer, ethylene-butyl acrylate copolymer or ethylene-methyl methacrylate copolymer.

4. The laminate of claim 1, wherein the second polymer layer comprises one or more of: polyethylene, polypropylene, poly-1-butene or ethylene polymer.

5. The laminate of claim 1, wherein the second polymer layer comprises a polyethylene woven fabric, polyethylene film or polyethylene sheeting.

6. The laminate of claim 1, wherein the second polymer layer has a thickness of from about 0.001 to about 0.020 inches.

7. The laminate of claim 1, wherein the tie layer has a thickness of from about 0.0005 to about 0.020 inches.

8. A process for making a laminate, the process comprising:
   a) providing a first polymer layer comprising a polyester or copolyester, wherein the first polymer layer has an inner and an outer surface, and a thickness of from about 0.080 inches to about 0.250 inches;
   b) providing a tie layer comprising consisting essentially of an alkyl acrylate polymer, wherein the tie layer has a first and a second surface;
   c) providing a second polymer layer comprising a polyolefin, wherein the second polymer layer has an inner and an outer surface;
   d) applying the tie layer to one or more of the inner surface of the first polymer layer or the inner surface of the second polymer layer and bringing the first and second polymer layers into proximal contact with each other, wherein the tie layer is situated between the first and second polymer layers, thereby providing a pre-laminate; and
   e) applying sufficient heat and/or pressure to the pre-laminate to provide a laminate material.

9. The process of claim 8, wherein the tie layer is applied in sheet form.

10. The process of claim 8, wherein the tie layer is applied by extrusion.

11. The process of claim 8, wherein the laminate is suitable for use in applications where a CC1 classification is required as defined by UBC Standard 26-7.

12. The process of claim 8, wherein the alkyl acrylate copolymer comprises one or more of ethylene-methyl acrylate copolymer, ethylene-ethyl acrylate copolymer, ethylene-butyl acrylate copolymer or ethylene-methyl methacrylate copolymer.

13. The process of claim 8, wherein the second polymer layer comprises one or more of: polyethylene, polypropylene, poly-1-butene or ethylene polymer.

14. The process of claim 8, wherein the second polymer layer comprises a polyethylene woven fabric, polyethylene film or polyethylene sheeting.

15. The process of claim 8, wherein the second polymer layer has a thickness of from about 0.001 to about 0.020 inches.

16. The process of claim 8, wherein the tie layer has a thickness of from about 0.0005 to about 0.020 inches.

* * * * *

UNITED STATES PATENT AND TRADEMARK OFFICE
CERTIFICATE OF CORRECTION

PATENT NO. : 7,037,576 B2 Page 1 of 1
APPLICATION NO. : 10/356011
DATED : May 2, 2006
INVENTOR(S) : Willham et al.

It is certified that error appears in the above-identified patent and that said Letters Patent is hereby corrected as shown below:

Column 12, line 64, "layer comprising consisting" should read --layer consisting--.

Signed and Sealed this

Fourth Day of July, 2006

JON W. DUDAS
*Director of the United States Patent and Trademark Office*